March 24, 1936.  P. S. MORGAN  2,035,182
MEANS FOR CORRECTING THE MEASURING ACTION OF FLUID METERS
Filed April 22, 1932  2 Sheets-Sheet 1

To Pump

INVENTOR
PORTER S. MORGAN
BY *Albert R. Henry*
ATTORNEY

March 24, 1936.   P. S. MORGAN   2,035,182
MEANS FOR CORRECTING THE MEASURING ACTION OF FLUID METERS
Filed April 22, 1932   2 Sheets-Sheet 2
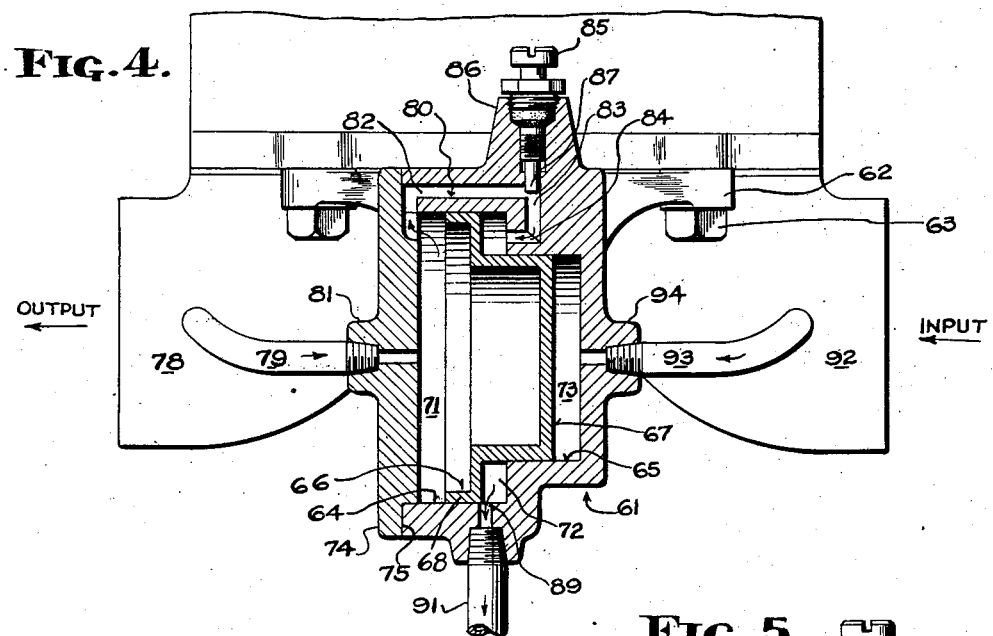
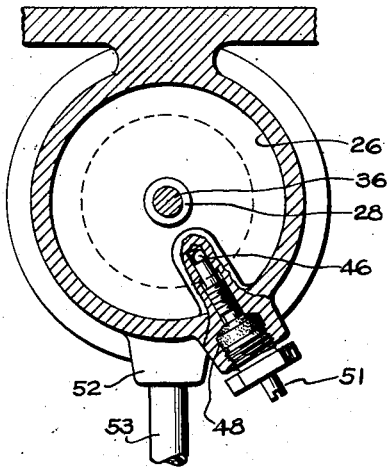
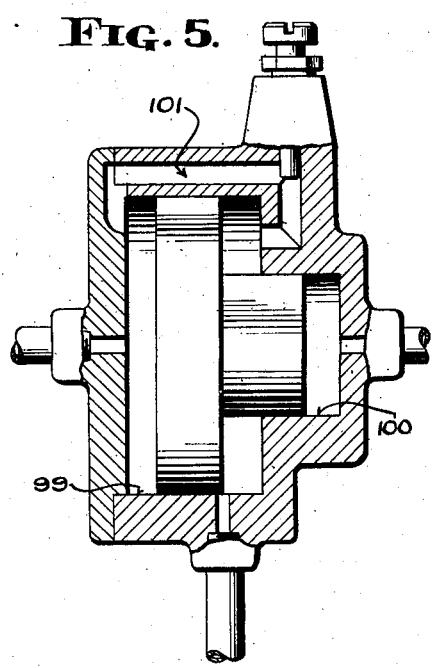
INVENTOR
PORTER S. MORGAN
BY *Albert R. Henry*
ATTORNEY

:

UNITED STATES PATENT OFFICE 2,035,182

MEANS FOR CORRECTING THE MEASURING ACTION OF FLUID METERS

Porter S. Morgan, Norwalk, Conn., assignor, by mesne assignments, to Liberty Share Corporation, Buffalo, N. Y., a corporation of New York Application April 22, 1932, Serial No. 606,948

8 Claims. (Cl. 73—167)

This invention relates to means for correcting the measuring action of fluid meters, and it has particular reference to the provision of means for withdrawing, from a mixed stream of measured and unmeasured fluid, a quantity equal to the unmeasured portion thereof, so that the delivered portion of the mixed stream is of known volume.

The measuring or metering of fluids or liquids in motion is usually attempted by causing the fluid stream, or a portion thereof, to pass through a casing containing a movable element which is actuated by the fluid in proportion to its rate of flow, and by translating the motion of such movable element to a suitable recording or indicating mechanism. In meters of this type, a drop in fluid pressure occurs between the inlet and outlet sides of the casing, and the differential in pressure tends to force fluid past the walls of the movable element, the clearance spaces between the walls and the casing being in the nature of apertures through which fluid may escape without affecting the movement of the movable element. As a result, the quantity of fluid actually passing through the meter under any given pressure and for a given interval of time is greater than the quantity of fluid reflected by the motion of the movable element, and a factor of error is thus introduced into the apparatus.

The amount of fluid which leaks through the meter without being measured, or, as it is sometimes termed, the "slippage", is proportional to the clearance area between the moving and fixed parts of the meter, and to the drop in pressure between the inlet and outlet ports. For this reason, it has not been deemed practical to calibrate a meter, to correct for slippage, for all possible rates of flow, and the objective heretofore sought in the art has been to design the meter so that variations in rate of flow, within certain limits, have had the least possible effect on the accuracy of the apparatus.

According to the present invention, it is proposed to treat a fluid stream which has so passed a meter or measuring device, in such manner as to divide it into two portions, one of which, the major portion, represents the amount which has actuated the movable element of the meter, and the other of which, the minor portion, represents that quantity which has passed the measuring element without affecting its movement. That is to say, the present invention proposes to overcome the stated inaccuracy in metering, due to slippage, by taking away from the emergent fluid that portion which has slipped by the measuring instrumentalities without having announced its presence, and by returning this portion to a point remote from the major portion of the stream. In effecting this result, the minor portion of the fluid is withdrawn through an orifice or a conduit containing at some point therein an orifice, whose effective area is such as to be equivalent to the slippage area in the measuring device, and a pressure equivalent to the pressure drop in the meter is imposed on this fluid. The invention further proposes the variation of the fluid pressure acting on the diverted minor portion of the mixed stream in response to changes in pressure conditions in the system so that, in effect, as much fluid is permitted to leak from the emergent mixed stream as has leaked into it while passing through the meter.

It may be shown that, in a meter of the type described, there is a certain fluid pressure $P$ on the intake side of the meter, and a certain lower pressure $(P-p)$ on the discharge side of the meter, and the diminution in pressure substantially represents the force required to operate the movable elements in the meter. It may also be demonstrated, both mathematically and by test, that the value of $(P-p)$ varies with changes in the velocity of the fluid stream. Additionally, it may be shown that if the areas between the meter chamber and the movable element therein be summed up, the total area so determined, or the slippage area, may be considered as an orifice of certain diameter. With these considerations in mind, it will now be obvious that, a certain quantity of fluid will leak through the measuring chamber, and, ignoring here the hydraulic constants entering into an explicit formula, the amount of fluid so leaking is a function of $(P-p)$ into the orifice area. In short, the stream withdrawn from the meter, and which is supposed to have been measured, is made up of two streams, one of which has affected the recording mechanism, and the other of which, the leakage volume, has not.

My invention involves a method of removing, from the emergent or mixed stream, a portion thereof, and a portion which is equal, at all times, to the unmeasured portion. To this end, the emergent stream is divided into two portions, by providing a branch pipe in the conduit for the mixed stream. At some point in the pipe there is provided a restriction or orifice, whose size is such, for the pressure involved, as to represent the slippage area in the meter. Upon this diverted portion is imposed a pressure, which, at all times, is a function of the valve (P—p), which value, of course, is determined by the velocity of the measured stream and the characteristics of the meter. That is to say, a certain condition of pressure, and leakage area, is reproduced in the emergent stream, so that the tendency for fluid to escape is the same as the tendency for fluid to leak into the mixed stream.

In the application of these principles in a practical way, I utilize the pressures existing in the fluid stream at the intake and discharge sides of the meter (P and P—p), to exert force on pistons whose relative areas are so proportioned that an unbalanced condition is set up, and fluid from the emergent stream is concurrently admitted into a control chamber in order to bring the pistons into a condition of equilibrium or rest. The areas of the pistons, and the total force acting thereon, are so related that there is created a pressure condition in the control chamber, proportional to the drop in pressure across the meter. By interposing the stated equivalent orifice in the diverted portion of the mixed stream, there is created a condition of leakage from the emergent fluid equal to that which injected thereinto the unmeasured fraction, namely, a product of the pressure and area equal to the value of (P—p) into the slippage area, whatever that value may be. Such treatment of the emergent stream recovers therefrom the unregistered portion thereof, so that, insofar as ultimate delivery of the emergent stream is concerned, the quantity of fluid delivered is equal to that quantity whose passage has been recorded.

The invention further comprehends various forms of apparatus for carrying the described method of treatment into effect, some of which are illustrated in the accompanying drawings and are described in the appended specification, to which reference may now be made for a fuller exemplification of the principles involved, and the objects and advantages to be derived from their application.

Fig. 3 is a section on the line 3—3 of Fig. 2 with a portion broken away to show the bleed valve.

Fig. 4 is a vertical section through a compensator forming a second embodiment of the invention.

Fig. 5 is a vertical section through a compensator forming a further embodiment of the invention.

Figure 1:
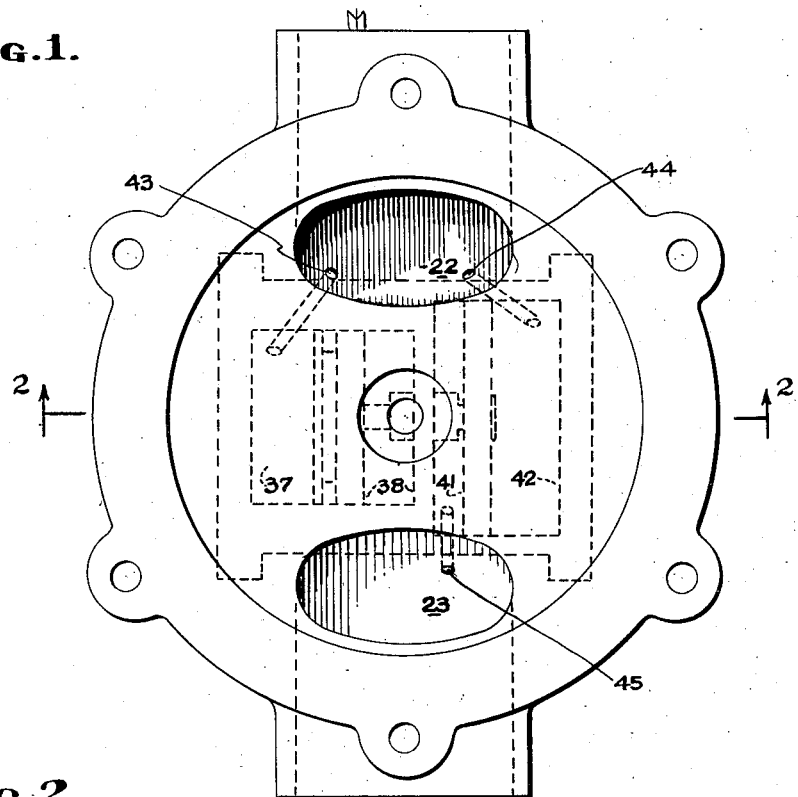
Fig. 1 is a plan view of a port plate of a meter showing the connections with the compensating device.
Figure 2:
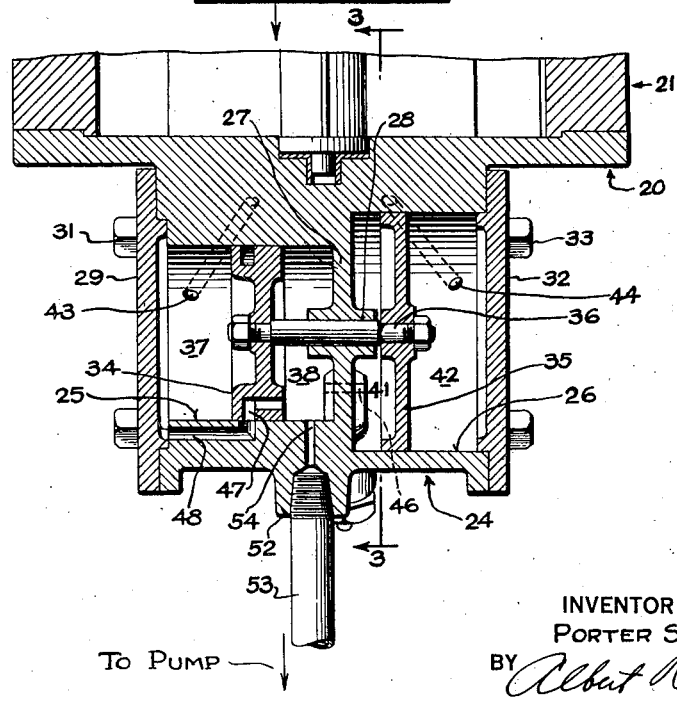
Fig. 2 is a section on the line 2—2 of Fig. 1.

In accordance with the embodiment of the invention shown in Figs. 1–3, the corrector or fluid reclaiming device is advantageously mounted on the lower head 20 of a metering device 21, which for exemplary purposes is illustrated as of the general type shown in my Patent No. 1,952,882, patented March 27, 1934. The input and output passages 22 and 23 respectively of the meter are also located in the lower head 20 for convenience of communication with the corrector as hereinafter more fully described.

The lower portion of the head is formed to provide a housing 24 having coaxial bores 25 and 26 separated by a wall 27 having an axial bearing 28 formed therein. The bore 25 is closed by a flanged head 29 which is secured thereto by screws 31, and, similarly, the bore 26 is provided with a head 32 secured by screws 33.

Pistons 34 and 35 are mounted in the bores 25 and 26 respectively, and are connected for unitary movement by a connecting rod 36, which is slidably mounted on the bearing 28 in the wall 27. The rod 36 is shouldered and threaded at each extremity to provide mounting means for the pistons which are secured thereto by suitable nuts. For convenience of reference, it will be assumed that the piston 34 divides the minor bore 25 into chamber 37 and control chamber 38, while the piston 35 divides the major bore 26 into chambers 41 and 42. The effective working area of the piston 34 in the chamber 38 is devised for the present exemplary purposes to be exactly one half that of the piston 35 in chamber 41.

The chambers are connected to the input and output passages in a manner suitable not only to balance the piston assembly, but to reproduce automatically, between the chamber 41 and the control chamber 38, pressure differential similar to that existent between the input and output passages of the meter. The end chambers 37 and 42, for example, are in direct communication with the inlet passage 22 by means of drilled holes 43 and 44 respectively (Figs. 1 and 2) and the large inner chamber 41 is connected to the outlet passage 23 by a drilled hole 45 (Fig. 1).

The control chamber 38 is in communication with the outlet passage of the meter by means of a bleed passage 46 extending through the wall 27 and entering the chamber 41 (Figs. 2 and 3). The control chamber also communicates with the inlet passage through a port 47 in the minor piston 34 and a cooperating passage 48 formed in the housing 24. The first connection, the passage 46, is manually adjustable by a screw valve 51 (Fig. 3) which extends through a suitable tapped hole in a boss 52 on the exterior of the housing, and which radially enters the wall 27 in position to control the effective area of the passage 46. The second connection, the port 47 and passage 48, provides a valve that is automatically adjustable in response to pressure conditions between the various chambers as hereinafter more fully set forth. The control chamber 38 is in fluid communication with the suction line of the pump which supplies fluid to the meter through a port 54 and a return pipe 53.

The operation of the described embodiment is as follows. With the fluid circuit closed it will be assumed that the pump is in operation to maintain a certain pressure per square inch in both input and output passages of the meter. The meter under this condition does not function, since there is no flow therethrough. Upon opening the nozzle valve, however, the meter immediately is operated by the fluid stream, which in passing therethrough operates the rotor or other moving instrumentality and also the registering mechanism connected to the same. This work is directly represented in a pressure drop between the input and output passages of the meter; for example, under full flow the pressure in the input passage will remain substantially the same, since the pump is capable of maintaining this pressure, while the pressure in the output passage would be considerably decreased from its original value. This difference in pressure drop is decreased as the fluid stream is reduced, although not necessarily in direct proportion to the volume of the stream.

Under all pressure conditions, the input pressure is communicated to the end chambers 37 and 42 through the holes 43 and 44 respectively, where loads are applied to the faces of the pistons in proportion to their effective area, which causes an unbalanced condition and the resultant thrust on the piston assembly. The chamber 41, being in communication with the output passage 23 through hole 45, imposes a load on the inner side of the major piston 35 and overcomes the previously mentioned resultant thrust to a considerable degree. This causes a movement of the piston assembly, whereupon the port 47 in piston 34 registers with the passage 48, thus permitting fluid from the inlet passage to enter the control chamber 38 until the pressures in the piston assembly are at a balance. It will be found that by properly proportioning the bores 25 and 26 in the cross sectional areas, the pressure drop (per square inch) between the chamber 41 and the control chamber 38 or outlet passage will always equal the pressure drop between the input and output passages. In other words, the meter pressure drop is reproduced between the inner chambers of the device.

Under the above described conditions it will be apparent, if the bleed passage 46 is adjusted to have an effective orifice equal to the slippage area in the meter, that a second meter condition is reproduced, that is, the liquid in the chamber 41 will bleed into the chamber 38 under the same prevailing slippage condition as is present in the meter. The device thus receives, in its control chamber 38, a stream of liquid substantially equal in volume to the leakage volume of the meter and returns such volume to the pump system through the port 54 and return pipe 53. It is, of course, advantageous to limit the effective area of the port 54 to less than the maximum area of the port 47, so that the pressure build-up in the control chamber 38 will not be affected by the draining of the fluid through the return pipe 53.

Upon a decrease in pressure drop in the meter, the piston assembly will immediately respond to the particular loads and move to the right until the port 47 in the piston 34 closes the passage 48 to a sufficient degree to again balance the piston assembly. It will be obvious that under any pressure condition the fluid draining through the vent port 54 will include a portion of the liquid received from bleed passage 46 and port 47, and, inasmuch as the liquid entry into the control chamber from the bleed passage is controlled by the pressure resistance in this chamber, it naturally follows that the amount of vented liquid through the port 54 must equal at all times the amount fed into the chamber through the bleed valve 46.

The embodiment of the invention shown in Fig. 4 provides a further method of obtaining the results described in the first embodiment. This device comprises a body 61 having bracket portions 62 for attachment to a convenient portion of a metering device by means of screws 63. The body is provided with concentric bores 64 and 65, forming an open housing for receiving a double piston 66, wherein a minor piston portion 67 thereof engages the bore 65, and a major piston portion 68 engages the bore 64, thus dividing the bores into three chambers: a major chamber 71 to the left of the piston, a central or control chamber 72 and a minor chamber 73 to the right of the piston. The body is closed by a flanged head 74 secured to the face 75.

The chamber 71 is connected to the outlet passage 78 of a meter of the type previously described by a pipe 79 which is secured to a boss 81 on the head 74. The control chamber 72 is also in communication with the outlet passage 78 by means of a bleed passage 80 formed by drilled holes 82, 83 and 84 in the body 61, which connect the chamber 71 to chamber 72, and whose orifice is manually adjustable by a screw valve 85 mounted in a boss 86 of the body 61 and having a seat portion 87 extending into the hole 83. The control chamber 72 is connected to the suction side of a pump through a vent port 89, in the wall of the chamber, and a connecting pipe 91 screwed into the body 61. The effective area of the vent port 89 is controlled by the movement of the piston portion 68 which is adapted to cover or uncover the same as hereinafter more fully explained. The minor chamber 73 in turn is connected to the input passage 92 of the meter by a pipe 93 screwed into a boss 94 on the right hand side of the body.

It has been found when the area ratio between the major and minor bore is two to one, that the bleed passage 80 is to be adjusted to an effective area equal to that of the slip area in the meter to insure proper functioning of the device. It also follows that the bore area may be varied, providing the bleed passage is correspondingly varied in proportion to the relation between the areas of the minor chamber 73 and the control chamber 72. For example, Fig. 5 shows a device of the general type last discussed wherein the major bore area 99 is four times that of the minor bore area 100. Under this condition the bleed passage 101 when adjusted would have an effective area of three times the slip area of the meter.

The operation of the embodiment of the invention shown in Fig. 4 is somewhat similar to that of the first embodiment, with the exception that the control chamber 72 is only fed through the bleed passage 82 and therefore receives fluid only from the outlet passage 78. The control chamber 72 thus receives liquid through the bleed passage 80 to balance the opposing forces in the chambers 71 and 73, wherein it will be found that the pressure drop between the chamber 71 and the control chamber 72 will be substantially equal to the pressure drop across the meter. The liquid in effect passes from a high pressure chamber to a lower pressure chamber in the same manner as the liquid leaks past the rotor of the meter. Simultaneously, the vent port 89 is continuously adjusted by the piston portion 68 to a position where the forces on the piston surfaces are in true balance. Inasmuch as the device when balanced is proportioned to reproduce the pressure drop conditions heretofore mentioned, it naturally follows since the vented volume of fluid substantially creates this condition that such vented volume actually represents the slippage volume through the meter.

In the case of a desired change in the bore proportions, the pressure drop between the control and minor chamber would be less than the actual drop across the meter dependent upon the area ratio of the bores.

From the foregoing description, it will be observed that the present invention provides for the delivery of an accurately known quantity of fluid, by measuring the same in a known fashion, but in treating the fluid which passes the meter to effect the withdrawal therefrom of whatever quantity has been added thereto, above the recorded volume. This treatment is predicated on the creation of a leakage area and pressure acting through such area, in proportion, either each directly or by their product, to the conditions of pressure and area originally permitting the addition of the unmeasured volume of liquid. It will be understood, of course, that other forms of apparatus may be employed in practicing the invention, and it should be further understood that a reversal of the action, as might occur with a meter in which the movement of the meter element created a higher discharge pressure than intake pressure, is considered within the scope of the invention, as set forth in the following claims.

I claim:

1. The combination with a fluid meter having inlet and outlet passages and a movable measuring element, means for compensating for slippage of fluid about said element comprising a fluid reclaiming device in communication with the meter outlet passage for withdrawing limited quantities of fluid therefrom, said reclaiming device having an outlet, and means responsive to fluid pressure variations between said passages and during flow through said meter for varying the flow through the outlet of said reclaiming device.

2. The combination with a fluid meter having inlet and outlet passages, of a bleed device from said outlet passage, means responsive to fluid pressure variations between said passages and during flow through said meter for varying the flow of liquid through said bleed device, and means in fluid communication with said bleed device for receiving the liquid passing therethrough.

3. The combination with a fluid meter having inlet and outlet passages, of a bleed device from said outlet passage and having a discharge opening, adjustable valve means for controlling the effective discharge opening of the bleed device, means responsive to fluid pressure variations between said passages and during flow through said meter for varying the flow of liquid through said bleed device, and means in fluid communication with said bleed device for receiving the liquid passing therethrough.

4. The combination with a fluid meter having inlet and outlet passages, of a fluid reclaiming device comprising a pressure chamber, a bleed opening connecting said outlet passage to said chamber, a fluid outlet for the chamber, a valve device connecting the outlet passage to said chamber, and means responsive to fluid pressure variations between the passages and during flow through said meter for operating said valve device, whereby the effective orifice of said outlet is varied in accordance with changes in the pressure differential across said meter.

5. The combination with a fluid meter having a casing, inlet and outlet passages, and a fluid responsive element in the casing, of a conduit connected to the outlet passage, an orifice of predetermined area formed in the conduit, said conduit having its other end disposed remote to the point of delivery of the fluid, and means responsive to the differential in pressure between the inlet and outlet passages and during flow through said meter for varying the pressure in said conduit between the orifice thereof and its delivery end.

6. The combination with a fluid meter having a casing, inlet and outlet passages, and a fluid responsive device in the casing, of a conduit connected to the outlet passage, a control chamber connected to the conduit, a drain line connected to the chamber, said conduit being formed with a restricted orifice, and means responsive to the diminution in pressure in the casing between the inlet and outlet passages and during flow through said meter for varying the pressure in the control chamber.

7. The combination with a fluid meter having inlet and outlet passages, of a fluid reclaiming device comprising a body formed with a pair of bored portions, one of said bored portions having a diameter greater than the other, a piston in each bored portion dividing such portions into four chambers, means connecting the pistons for unitary movement, conduit means connecting the outermost chambers to the inlet passage, conduit means connecting the innermost chambers to the outlet passage, adjustable valve means in the last conduit means for the minor innermost chamber, a passage in the body connecting the minor chambers, and a vent passage entering the innermost minor chamber, said minor and major pistons being movable in accordance with pressure conditions in said chambers, said minor piston being adapted to control the effective opening of said connecting passage, whereby pressures in said innermost minor chamber are maintained to balance the total differential pressures in the remaining chambers.

8. The combination with a fluid meter having inlet and outlet passages, of a fluid reclaiming device comprising a body formed with communicating bored portions, one of said bored portions having a diameter greater than the other, a piston member having a minor piston portion engaging in the minor bored portion, and a major piston portion engaging in the major bored portion, said piston member dividing said bores into a major chamber in the major bored portion, a central control chamber, and a minor chamber in the minor bored portion, conduit means connecting the major chamber to the output passage, a second conduit means connecting the minor chamber to the input passage, a valve controlled passage connecting the major chamber to the control chamber and a vent port in said control chamber adapted to be covered or uncovered by the major piston portion.

PORTER S. MORGAN.